United States Patent
Parikh et al.

(10) Patent No.: US 12,039,034 B2
(45) Date of Patent: *Jul. 16, 2024

(54) UNDETECTABLE SANDBOX FOR MALWARE

(71) Applicant: Microsoft Technology Licensing, LLC, Redmond, WA (US)

(72) Inventors: Jugal Parikh, Sammamish, WA (US); Geoffrey Lyall McDonald, Vancouver (CA); Mariusz Hieronim Jakubowski, Bellevue, WA (US); Seyed Mehdi Fatemi Booshehri, Montreal (CA); Allan Gordon Lontoc Sepillo, Woodinville, WA (US); Bradley Noah Faskowitz, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,159

(22) Filed: Jan. 30, 2023

(65) Prior Publication Data

US 2023/0185902 A1     Jun. 15, 2023

Related U.S. Application Data

(63) Continuation of application No. 16/888,794, filed on May 31, 2020, now Pat. No. 11,568,052.

(51) Int. Cl.
*G06F 21/74* (2013.01)
*G06F 9/54* (2006.01)
*G06F 18/21* (2023.01)
*G06F 18/214* (2023.01)
*G06F 21/53* (2013.01)
(Continued)

(52) U.S. Cl.
CPC .............. *G06F 21/53* (2013.01); *G06F 9/542* (2013.01); *G06F 18/214* (2023.01); *G06F 18/217* (2023.01); *G06F 21/566* (2013.01); *G06N 20/00* (2019.01); *G06F 2221/033* (2013.01)

(58) Field of Classification Search
None
See application file for complete search history.

(56) References Cited

U.S. PATENT DOCUMENTS 9,171,160 B2 * 10/2015 Vincent ................ G06F 21/566
10,162,966 B1 * 12/2018 Huang .................... G06F 21/53
10,621,348 B1 * 4/2020 Ciubotariu ............ G06F 21/566
(Continued)

*Primary Examiner* — Saleh Najjar
*Assistant Examiner* — Devin E Almeida
(74) *Attorney, Agent, or Firm* — Schwegman Lundberg & Woessner, P.A.

(57) ABSTRACT

Embodiments seek to prevent detection of a sandbox environment by a potential malware application. To this end, execution of the application is monitored, and provide information about the execution to a reinforcement learning machine learning model. The model generates a suggested modification to make to the executing application. The model is provided with information indicating whether the application executed successfully or not, and this information is used to train the model for additional modifications. By modifying the potential malware execution during its execution, detection of a sandbox environment is prevented, and analysis of the potential malware applications features are better understood.

19 Claims, 8 Drawing Sheets

(51) Int. Cl.
*G06F 21/56* (2013.01)
*G06N 20/00* (2019.01)

(56) References Cited

U.S. PATENT DOCUMENTS

| | | | |
|---|---|---|---|
| 2014/0317745 A1* | 10/2014 | Kolbitsch | G06F 21/566 726/24 |
| 2017/0337372 A1* | 11/2017 | Zhang | G06F 21/53 |
| 2019/0108339 A1* | 4/2019 | Gu | G06F 21/568 |

* cited by examiner

UNDETECTABLE SANDBOX FOR MALWARE

CROSS-REFERENCE TO RELATED APPLICATIONS

This application is a continuation of prior application Ser. No. 16/888,794, filed on May 31, 2020, which is incorporated by reference herein in its entirety.

BACKGROUND

Dynamic malware analysis observes behavior of suspect code when detonating (executing) each sample of potential malware in a controlled analysis environment (sandbox). Actions of the suspect code are then studied. Results of these studies can include indicators of compromise (IOC). Furthermore, the behavior of the suspect code during execution is used to determine if the code is malicious. The IOC's extracted are then leveraged to:

Extend defenses against future variants,
Block other related malicious activity,
Dissect malware families of interest to understand their operations,
Take down responsible malware actors Many sandboxes are implemented as virtualized systems that can easily be rolled back to a clean state once the analysis is complete. However, these virtualized systems may not realistically simulate a real user's machine in one or more respects. Given the use of sandboxing to identify a malware threat, attackers have employed multiple techniques to detect the presence of such a virtual environment and change behavior of the malware application's behavior based on this detection. Moreover, some of today's malware is designed to bypass detonation using many different evasion techniques. A large amount of time and effort is spent by malware researchers in identifying these evasive techniques and patching the detonation environment to avoid to such checks.

DETAILED DESCRIPTION

Figure 1:
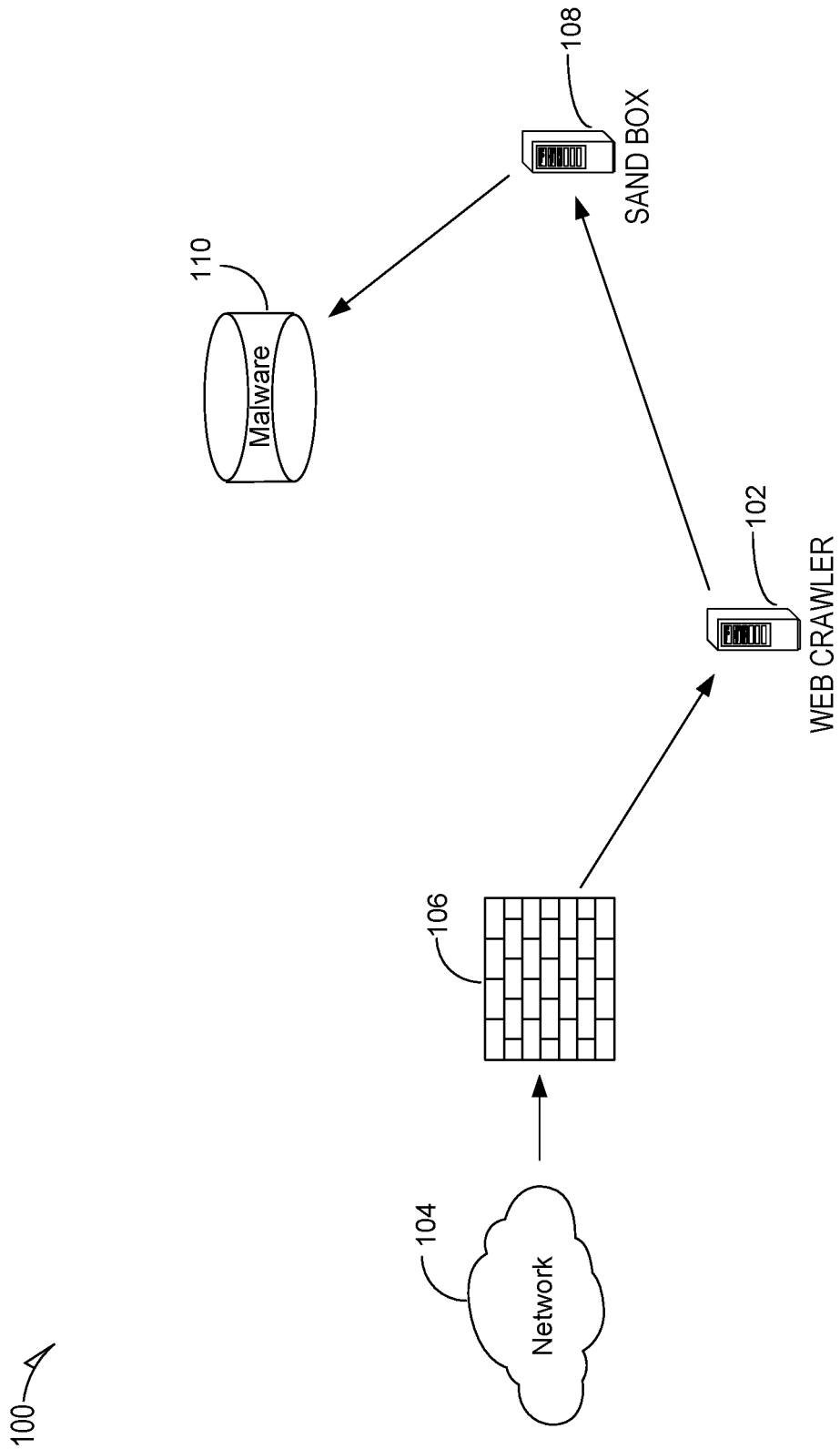
FIG. 1 is an overview diagram of an example system implementing one or more of the disclosed embodiments.

The disclosed embodiments provide for improved methods and systems of malware detonation. As described above, many security researchers rely on sandbox environments to analyze malware applications and better understand their behaviors. This understanding is used for a variety of purposes, including developing more effective malware detection techniques, identifying security vulnerabilities in existing software, and providing signatures or behavior profiles to improve run-time detection of malware applications.

As malware has become more sophisticated, techniques have been introduced by malware authors to detect when the malware is running in a sandbox environment. Once this is detected, the malware inhibits one or more of its features, making it more difficult and/or impossible to gather the forensics. Some malware monitors, for example, a number of CPUs of a system executing the malware. Since many sandbox environments are virtualized, the number of CPUs reported by an operating system is typically a low number, such as one (1). In contrast, many common desktop computers include multiple CPU codes, and in general report a higher number. The malware uses, in some embodiments, a low number of CPUs as evidence that it may be running within a sandbox environment. Another technique is for the malware to analyze a "documents" folder. If a number of files included in the documents date, and/or modification dates of said documents do not appear typical for a real user computer, some malware considers this as evidence of a sandbox environment. Thus, a technical problem is presented in that it can be increasingly difficult to detonate malware in a sandbox testing environment, where information about the malware can be obtained via analysis, and mitigating actions taken based on the analysis.

To solve this technical problem, and to make a sandbox environment less visible to potential malware being analyzed on it, the disclosed embodiments intercept program execution of the malware in order to obscure certain characteristics of the sandbox environment and cause the malware to perform an analysis consistent with a real, non-sandbox environment. If the malware is unable to detect the sandbox, it generally will function normally, allowing full analysis of its methods of operation.

To prevent detection of the sandbox environment, some embodiments intercept or otherwise hook programmatic execution of the suspected malware application. In some embodiments, each individual instruction, such as an assembly or machine level instruction, bytecodes, precompiled code (p-code), other intermediate code instruction, or even a source level instructions in some embodiments, is intercepted and provided to a reinforcement learning model. The reinforcement learning model is trained to provide modification instructions based on the intercepted assembly instructions. The modification instructions indicate one or more modifications to perform on the program execution of the suspected malware application. For example, the modifications instructions indicate in various embodiments, one or more of modification of a register value, modification of a function return value, modification of a function input parameter, modification of a condition evaluation in the malware code, or modification of a branch instruction in the malware code.

Some embodiments do not intercept instructions executed by the suspected malware as described above, but instead intercept function calls to one or more external application programming interface(s) API(s). For example, some embodiments intercept JavaScript library API calls and/or operating system API calls. Upon intercepting an API call, information relating to the API call is provided to a reinforcement learning model. The information relating to the API call can include input parameters passed to the API call, a call stack of the suspect malware application, and in some cases, indications of code of the suspect application that is within a vicinity of the API call. The reinforcement learning model is, as above, configured to provide program execution modification instructions based on the provided information. The reinforcement learning model indicates, in various embodiments, to modify a return value of the API, an output parameter of the API, an input parameter of the API, a modification to a condition evaluation in the suspect malware application itself, a modification of a branch instruction in the suspect malware application itself, or other modification.

FIG. 1 is an overview diagram of an example system 100 implementing one or more of the disclosed embodiments. The system 100 includes a web crawler computer 102, that accesses a network 104 (e.g. the Internet) via a firewall 106. The web crawler computer 102 identifies data available via the network 104 (e.g., via web sites) and identifies applications that attempt to run on a computer that downloads the data. For example, a website identified by the web crawler attempts, in some examples, to download and install an executable file on the downloading machine, and/or run a scripting language application within a browser environment provided by the downloading computer. In some embodiments, these identified applications are provided by the web crawler computer 102 to a sandbox environment 108. In some embodiments, the potential malware applications are identified manually. The sandbox environment 108 attempts to execute these applications. The sandbox environment 108 is at least partially isolated from other environments within the system 100 so as to mitigate any potential damage that may be done by execution of these identified applications.

One result of the analysis performed within the sandbox environment 108 is identification of malware applications, or those application with a malicious intent when they execute on a particular computer. Malware applications can have a variety of goals, including data destruction, data collection, or ongoing spying on a network in which they have been able to obtain access. Some malware applications utilize their host computers as proxies for other nefarious activities. For example, some denial of service attacks are orchestrated by armies of otherwise innocent computers which have been infected with malware bots, configured to carry out the denial of service attack upon receiving a command from a central controller, which is some circumstances, is located offshore in difficult to police jurisdictions.

After a malware application is identified, it is stored, in some embodiments, in a malware data store 110. The malware data store 110 is then used, in various embodiments, to improve protection against malware applications. For example, malware stored in the malware data store 110 is studied, in some embodiments, to identify behavioral patterns which can be detected by dynamic threat assessment applications protecting most modern computing systems. The malware stored in the malware data store 110 is further used, in at least some embodiments, to identify vulnerabilities in the designs and/or architectures of widely used computer operating systems and/or applications.

Figure 2:
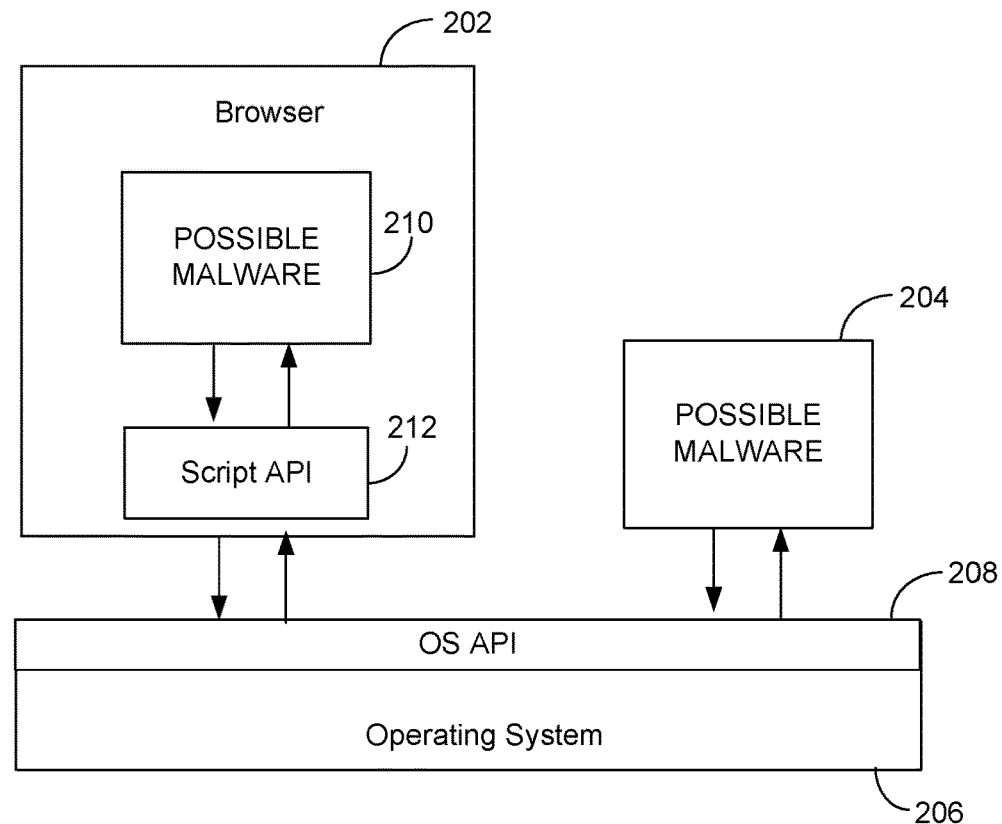
FIG. 2 is an overview diagram of an example system implementing one or more of the disclosed embodiments.

FIG. 2 is an overview diagram of an example system 200 implementing one or more of the disclosed embodiments. The system 200 includes a browser application 202, and a first potential malware application 204. Each of the browser application 202 and first potential malware application are applications managed by an operating system 206. The browser application 202 and first potential malware application 204 both interface with the operating system 206 via an operating system application programming interface (API) 208. When the operating system 206 is a Microsoft Windows based operating system, the browser application 202 and first potential malware application 204 are ".exe" or ".com" files, at least in some embodiments. When the operating system 206 is a Linux operating system, the browser application 202 and first potential malware application 204 includes, in some embodiments, object code compatible with a hardware platform running the operating system 206.

FIG. 2 also shows a second potential malware application 210. The second potential malware application 210 differs from the first potential malware application 204 in that the second potential malware application 210 runs within an environment provided by the browser application 202. In some embodiments, the second potential malware application is a JavaScript application. The browser application 202 provides a script API 212 for use by the second potential malware application 210 running within the environment provided by the browser application 202. The second potential malware application 210 interfaces with the script API 212 to accomplish various functions. In some embodiments, the script API 212 calls out to the OS API 208 as necessary to perform at least a portion of those functions.

As described below, the disclosed embodiment intercept instructions and/or API calls executed by the first potential malware application 204 and/or the second potential malware application 210. These intercepted instructions and/or API calls are provided to a machine learning model, and a modification to be made to the first potential malware application 204 and/or second potential malware application 210.

Figure 3:
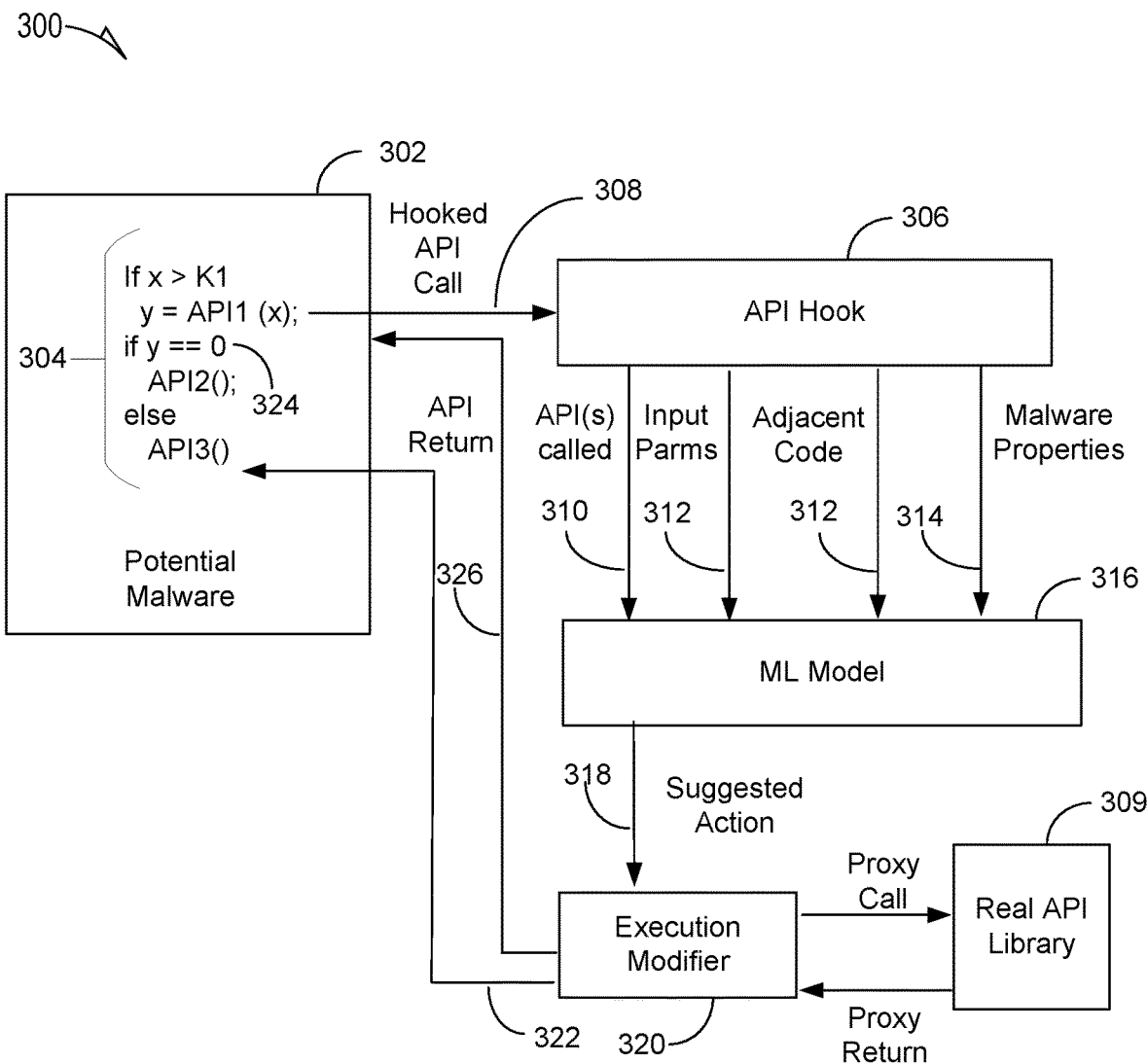
FIG. 3 is a dataflow diagram of example dataflow within an example sandbox architecture that is implemented in one or more of the disclosed embodiments.

FIG. 3 is a dataflow diagram of example dataflow within an example sandbox architecture 300 that is implemented in one or more of the disclosed embodiments. FIG. 3 shows a potential malware application 302. We refer to the application as a potential malware application 302 because in some cases, the application is a malware application and in some other cases, it may be a perfectly benign application. The potential malware application 302 includes code 304. The code 304 is executable code in some embodiments. For example, the code 304 is native assembly or machine language code compatible with a hardware platform and operating system upon which the potential malware application is executing in some embodiments. In other embodiments, the code 304 is intermediate code, such as p-code or even scripting source code that is at least partially interpreted before execution by a hardware processor.

FIG. 3 shows an API hook 306 implemented by some of the disclosed embodiments. The API hook 306 is configured to intercept function calls to one or more APIs (e.g., script API 212 or OS API 208) that are executed by the potential malware application 302 and the code 304. In some embodiments, the API hook 306 is a debug application. In these embodiments, the debug application is configured to intercept program execution of the potential malware application 302 when an address outside of the potential malware application 302 code 304 is accessed (e.g., to access an API library for example, such as the API library 309 discussed further below. In some embodiments, an operating system (e.g., operating system 206) supporting the sandbox architecture 300 provides an API hook capability, and thus a debugger is not necessary. Some embodiments utilize a hardware emulator to implement the API hook 306. For example, in some embodiments, a traditional hardware processor of a computer is replaced by a hardware emulator that is able to simulate operation of the OEM hardware circuitry, and also allow monitoring and/or intercepting of programmatic activity being executed by the simulated hardware processor.

Upon intercepting an API call 308 (or any function call), the API hook 306 determines information relating to the hooked API call. This information includes, in various embodiments, one or more of an indicator of the function name 310 of the API call 308, values of input parameters 312 passed from the potential malware application 302 to the API call 308, a call stack of the potential malware application 302 when the API call 308 is made, code of the potential malware application 302 in a vicinity or adjacent to the API call 308, properties 314 of the potential malware application (e.g., a name of the potential malware application, size of the potential malware application, etc.) or other information to a machine learning model 316. With respect to embodiments that provide code adjacent to the API call, some embodiments provide a predefined number of bytes of code prior to the API call in an image (file) of the potential malware application 302, and a second predefined number of bytes of code after the API call in the image (file) of the potential malware application 302. Some embodiments provide a predefined number of instructions of the potential malware application (assembly/machine instructions or intermediate code instructions, or source instructions) prior to and subsequent to the API call.

The model 410 includes data, defining relationships between previous suggested modifications and resulting success or unsuccessful execution of a potential malware application, as described below, and an algorithm to determine a modification based on inputs provided to the model 410, and the data defining the relationships. The machine learning model 316 is trained to determine a suggested modification 318 to the potential malware application 302 based on the information provided by the API hook 306. In some embodiments, the ML model implements a reinforcement learning algorithm. The machine learning model 316 is trained, in some embodiments, to generate suggested modifications that maximize a probability of the potential malware application 302 completing successfully. Successful completion has a variety of definitions depending on embodiment, but place one or more conditions on execution of the potential malware application 302. Some embodiments define successful completion as establishment of a network connection by the potential malware application with a remote device, creating and/or writing to a file, writing to a system registry (e.g., the Microsoft Windows registry), spawning one or more new processes or threads (different from the malware application itself). Some embodiments evaluate whether the potential malware application 302 has created or written to any files as one criterion when evaluating whether the malware application has successfully operated. Some embodiments count a number of API calls made by the potential malware application. Some embodiments base a determination of whether the potential malware application has successfully executed on whether the count exceeds a predetermined threshold.

The suggested modification 318 is provided to an execution modifier component 320, which implements the modification 322 on the execution of the potential malware application 302. In some embodiments, the suggested modification 318 indicates a modification to an API return value of the API call 308. In this case, the execution modifier invokes a real API in the API library 309 corresponding to the API call 308, but substitutes any return value from the API of the API library 309 for a different return value. In some embodiments, the different return value is selected from a list of common (e.g., N most frequently returned) return values from the hooked API. The selected return value is then used as the different return value. In some embodiments, the suggested modification is no modification. In this case, the execution modifier 320 acts simply as a proxy, and invokes the hooked API of the real AP library, and passing through any input parameters, output parameters, and return values in an unmodified form.

In some embodiments, the suggested modification is a modification to the execution of a portion of code included in the potential malware application 302 itself. For example, some embodiments indicate a modification to a condition that is subsequent to the API call 308, such as condition 324. Modification of the condition 324 is accomplished using various means by various embodiments. Some embodiments modify instructions included in the potential malware application 302 that implement the condition 324 to perform an alternate operation. Other embodiments intercept operation of the condition 324 and modify register or memory values necessary to alter a result of the condition. As part of the modification process, the API call is allowed to return control 326 to the executing program by the execution modifier 320.

Figure 4:
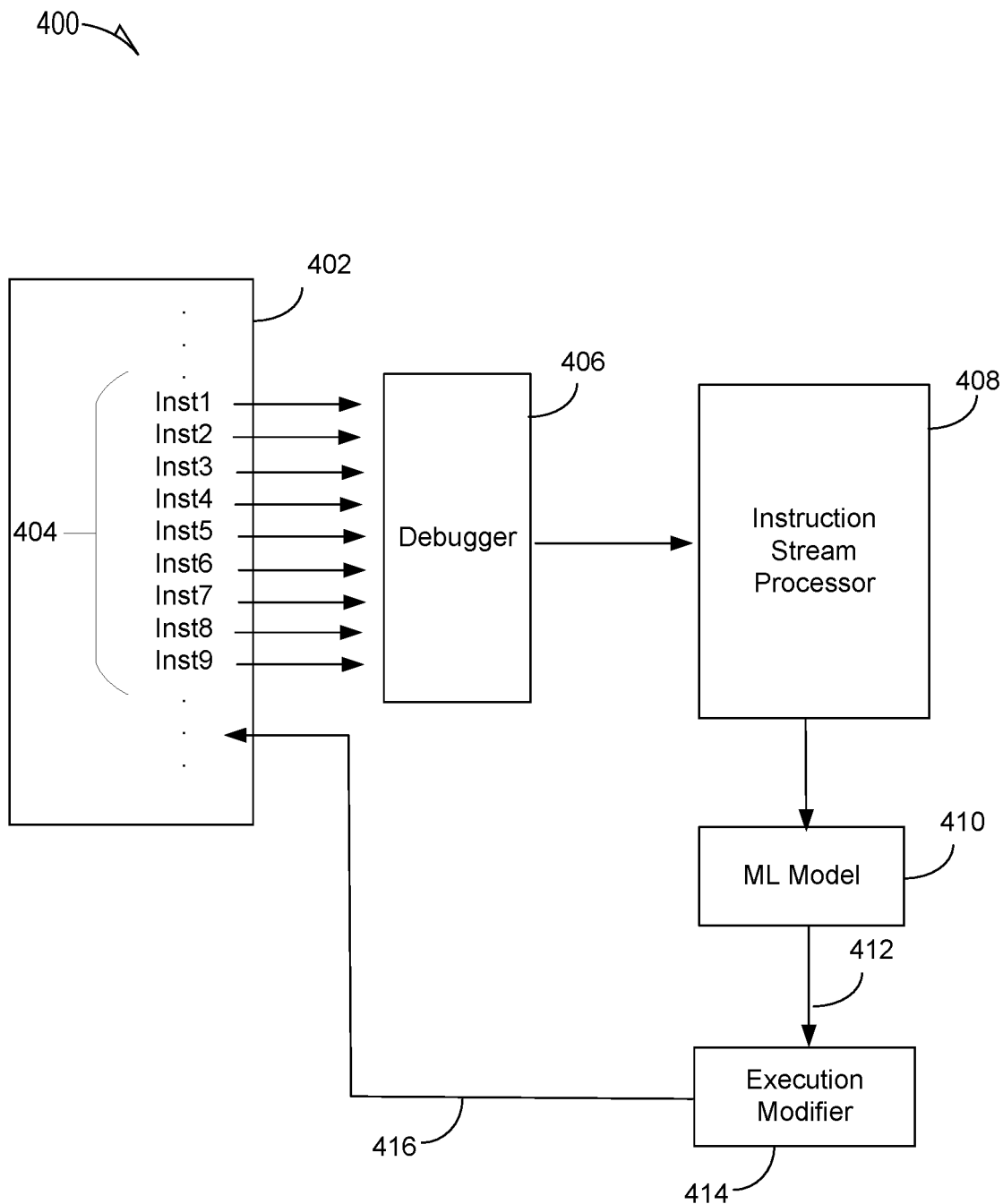
FIG. 4 shows another embodiment of a sandbox architecture implemented by one or more of the disclosed embodiments.

FIG. 4 shows another embodiment of a sandbox architecture 400 implemented by one or more of the disclosed embodiments. The sandbox architecture 400 includes a potential malware application 402. The potential malware application 402 executes a stream of instructions 404, each of which is provided to a debugger 406. In some embodiments, the potential malware application 402 is running "under" control of the debugger 406, which is able to "single step" through each of the instructions executed by the potential malware application 402. Some other embodiments do not use a debugger as illustrated in FIG. 4 to intercept the stream of instructions 404. Instead, for example, some implementations utilize a hardware emulator, in a similar manner as that described above with respect to FIG. 3, to intercept the stream of instructions 404.

The stream of instructions is provided by the debugger 406 to an instruction stream processor 408. The instruction stream processor 408 provides the stream of instructions 404 to a machine learning model 410. The machine learning model 410 implements, in at least some embodiments, a reinforcement learning algorithm. The model 410 includes data, defining relationships between previously suggested modifications and the resulting successful or unsuccessful execution of a program to which the suggest modifications were applied, and an algorithm to determine a modification based on inputs provided to the model 410, and the data defining the relationships. Via sequential application of the machine learning model 410, the model 410 develops the data defining relationships between the suggested modifications and any result achieved from them, and is able to use this data to provide a suggested modification 412 that maximizes successful execution of the potential malware application 402.

As discussed above, some embodiments define successful execution as that execution which results in the potential malware application 402 establishing a network connection with a remote device and/or spawning at least one additional process or thread (different from the malware process/thread itself). One or more of file I/O activity, creation and/or writing of a system registry entry or entries, and/or a number of API calls made by the potential malware application can also be used by various embodiments to determine if the malware application has successfully executed.

The suggested modification 412 indicates a variety of modifications in various embodiments. For example, the suggested modification 412 indicates, in some cases, modifications of register or memory values at particular places within the execution of the stream of instructions 404. The suggested modification 412, indicates, in some cases, modification of one or more of the instructions included in the stream of instructions 404. For example, one or more instructions are modified to change operation of a branch condition, branch, or other conditional logic within the potential malware application 402.

The suggested modification 412 is provided to an execution modifier 414, which performs 416 the indicated modification.

Figure 5:
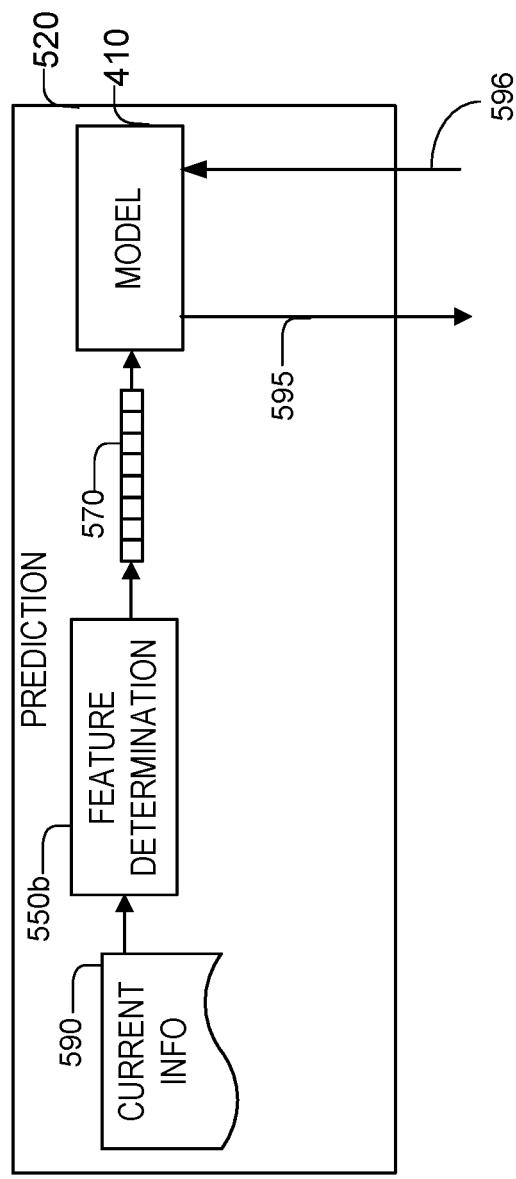
FIG. 5 shows an example machine learning module according to some examples of the present disclosure.

FIG. 5 shows an example machine learning system 500 according to some examples of the present disclosure. Machine learning system 500 utilizes a prediction module 520.

In the prediction module 520, current information 590 is input to the feature determination module 550b. The current information 590 represents characteristics of a potential malware application being analyzed by the disclosed embodiments (e.g., potential malware application 302 or potential malware application 402). Feature determination module 550b determines, from the current information 590, a set of features 570. In some embodiments, the set of features includes an instruction stream of the potential malware application, an API call of the potential malware application, input parameters to the API call, a call stack of the potential malware application at the API call, properties of the potential malware application, or other characteristics of the potential malware application. The set of features 570 is provided to the machine learning model 410 to generate a suggested modification 595. An indication of whether the potential malware application operated successfully is provided back to the model 410 as model input 596.

Figure 6:
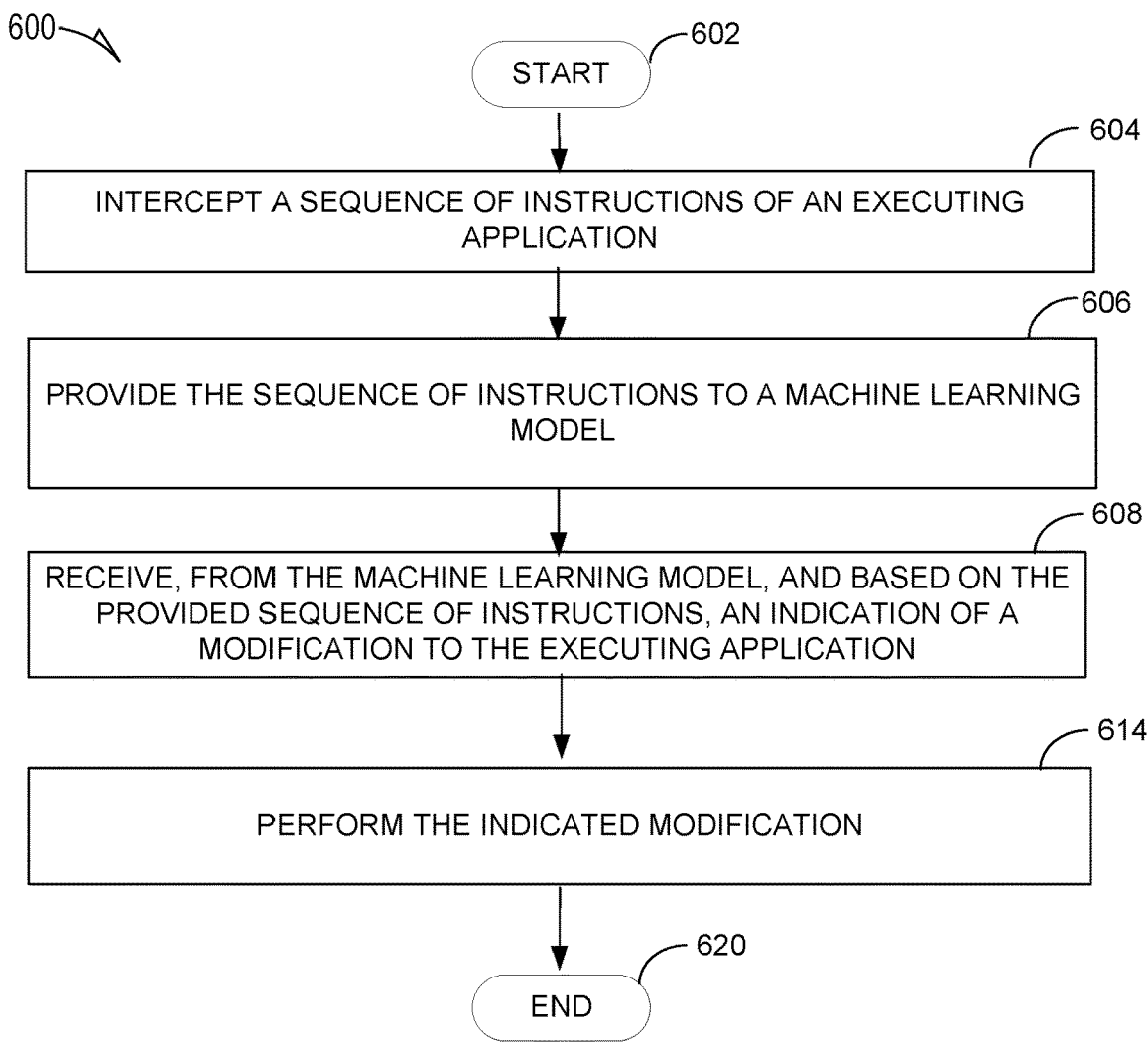
FIG. 6 is a flowchart of a method for modifying execution of an application.

FIG. 6 is a flowchart of a method for modifying execution of an application. In some embodiments, one or more of the functions discussed below with respect to FIG. 6 and method 600 are performed by hardware processing circuitry. In some embodiments, instructions (e.g. 824 discussed below) stored in a memory (e.g., memory 804 and/or 806 discussed below) configure a hardware processor (e.g., processor 802 discussed below) to perform one or more of the functions discussed below with respect to FIG. 6 and method 600.

After start operation 602, method 600 moves to operation 604, where a sequence of instructions of an executing application are intercepted. As discussed above with respect to FIG. 4, in some embodiments, a stream of instructions (e.g. stream of instructions 404) are intercepted using a debugger 406. Alternate embodiments utilize other technologies to intercept the instructions, such as a hardware emulator. In some embodiments, the executing application is a "native" application, such as first potential malware application 204, which executes an instruction set native to the hardware upon which it is operating. In some embodiments, the executing application is an interpreted application or script-based application, such as the second potential malware application 210, also discussed above with respect to FIG. 2. In this case, the sequence of instructions are not "native" to the hardware, but are intermediate instructions such as p-code, or even source code instructions in some embodiments.

In some embodiments the sequence of instructions include a function call instruction or, in other words, an API function call.

In operation 606, the sequence of instructions is provided to a machine learning model. As discussed above, some embodiments use a machine learning model configured to implement a reinforcement learning approach. The machine learning model is trained to maximize a likelihood of a successful execution of the executing application. Successful execution has various definitions in various embodiments. Some embodiments define successful execution as the executing application performing at least one of establishing a network connection with a remote computer, spawning a new process or thread, or creating or writing to a file.

In operation 608, a suggested modification is received from the machine learning model. The suggested modification is in response to the provided sequence of instructions of operation 606. As discussed above, several different modifications are suggested by the machine learning model in a variety of circumstances. In some cases, no modification is suggested. In some cases, the machine learning model indicates that a register value or data value of the executing application be modified at a particular execution point of the executing application. In some cases, the modification indicates that a return value or input parameter of an API function be modified. In some embodiments, the suggested modification is to change operation of a conditional statement in the executing application itself, for example, by modifying instructions themselves within the executing application, or by modifying registers and/or data values so as to change the conditional operation of the executing application.

In operation 614, the indicated modification is performed. Some embodiments of method 600 are performed iteratively which a single application is being executed. As explained above, the disclosed embodiments provide for increased successful operation of potential malware in a sandbox environment. By enabling the potential malware to execute successfully, additional information regarding the malware is obtained. This information is used, in some embodiments, to configure run time malware detection software, to identify vulnerabilities in existing software, or to further improve a sandbox testing environment. After operation 614, method 600 moves to end operation 620.

Some embodiments of method 600 maintain a log or record of modifications to made to a potential malware application. A sequence of modifications are thus provided in this log in at least some embodiments. Some embodiments generate one or more reports providing or displaying at least a portion of data in the log after a particular potential malware application is executed in a sandbox environment. This report would thus identify modifications necessary to cause the potential malware application to successfully execute.

This sequence of modifications is used, in some embodiments, to make modifications to the sandbox environment such that the sandbox environment is less detectable to other potential malware applications. For example, if modification of an API call value to a particular value is frequently successful at facilitating successful execution of a potential malware application, a configuration of the sandbox is modified, in some cases, such that the API call value returns the particular value without any intervention by the disclosed embodiments. As one example, if an API call is modified to return a number of processors included in a sandbox computer as a value of eight (8) provides for successful execution of potential malware applications, a configuration file of an operating system is modified such that the API returns the value of eight (8).

Some embodiments provide an algorithm that analyzes the log of modifications and automatically (e.g. without human intervention) generates modifications to a sandbox environment to avoid the need for such modifications. For example, the algorithm, in some embodiments, identifies modified return values of one or more APIs and automatically changes a sandbox configuration such that the sandbox configuration is consistent with the modified return values. This will reduce the number of modifications required during dynamic execution of additional potential malware applications.

Figure 7:
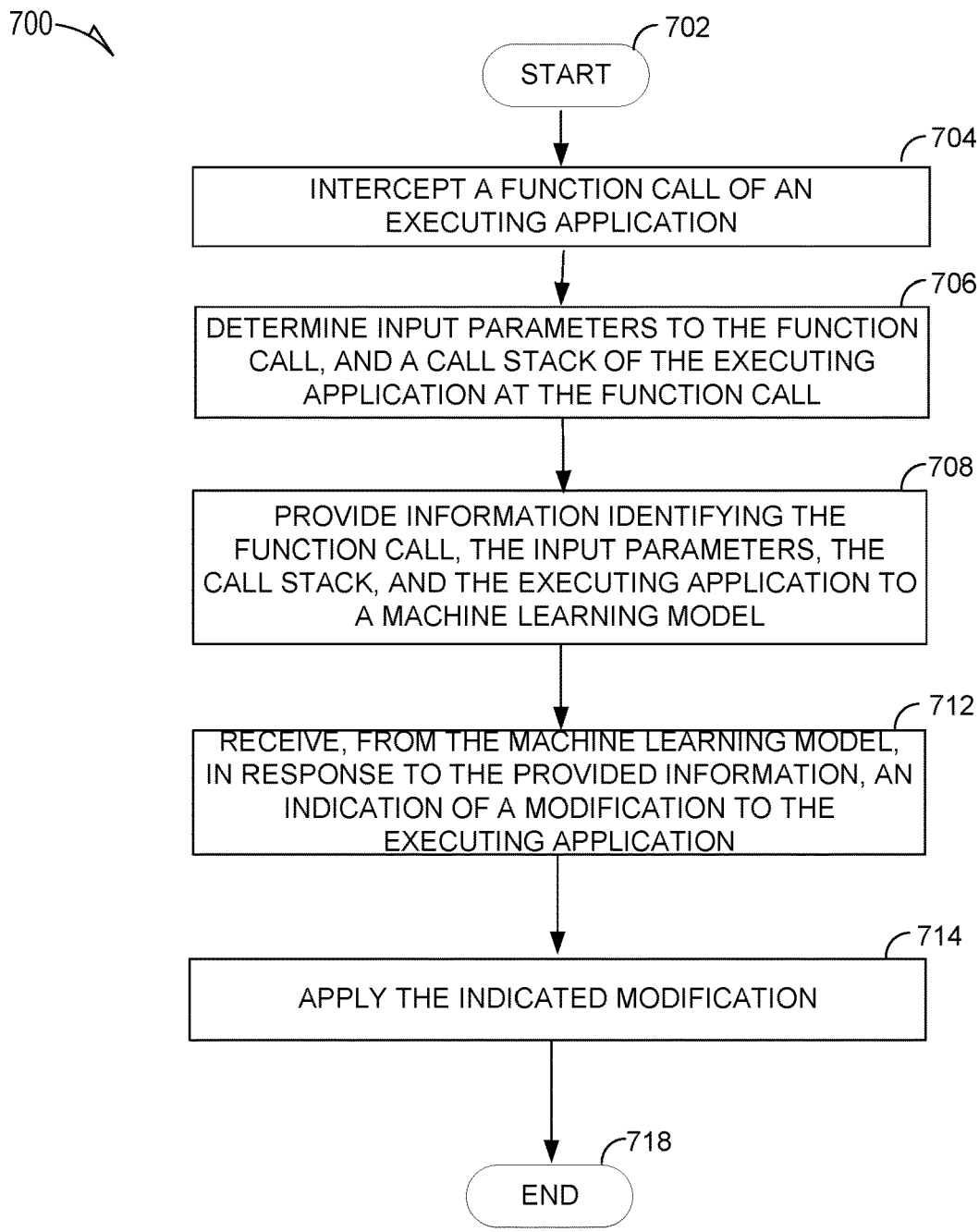
FIG. 7 is a flowchart of a method for modifying execution of an application.

FIG. 7 is a flowchart of a method for modifying execution of an application. In some embodiments, one or more of the functions discussed below with respect to FIG. 7 and method 700 are performed by hardware processing circuitry. In some embodiments, instructions (e.g., 824 discussed below) stored in a memory (e.g., memory 804 and/or 806 discussed below) configure a hardware processor (e.g., processor 802 discussed below) to perform one or more of the functions discussed below with respect to FIG. 7 and method 700. In some embodiments, method 700 is included in method 600, discussed above with respect to FIG. 6. For example, some embodiments of method 600 overlap with at least portions of embodiments of method 700.

After start operation 702, method 700 moves to operation 704, which intercepts a function call of an executing application. In some embodiments, the executing application is executing within a sandbox environment. The sandbox environment is a virtualized computing environment in at least some embodiments. The application is suspected, in at least some embodiments, of being a malware application. Thus, the application has at least some potential for including malware (e.g. nefarious) features, but is not necessarily malware. In some cases, a potential malware application is a perfectly benign and harmless application. However, some other potential malware is actually malware and is configured to destroy computing resources, or perform other nefarious activities such as unauthorized copying or transfer of data, ransomware, or other functions understood to be included in the term malware.

As discussed above with respect to FIG. 3, some embodiments intercept API calls made by an executing application. In some embodiments, the executing application is a "native" application, such as first potential malware application 204, which executes an instruction set native the hardware upon which it is operating. In some embodiments, the executing application is an interpreted application or script-based application, such as the second potential malware application 210, also discussed above with respect to FIG. 2. The function called is included in an API library in some embodiments (e.g., API library 309). Some embodiments of operation 704 capture or intercept a sequence of function calls. In those embodiments, each of the functions discussed below with respect to operation 706 and 708 are repeated for each captured function call.

In operation 706, input parameter values to the function call are determined. In some embodiments, the function call includes no input parameters. Some embodiments also obtain a call stack of the executing application. For example, some embodiments send a signal 3 to a Java process, which causes a stack trace to be generated to a standard output (stdout) device. Some embodiments use a utility called j stack from a command line to obtain the call stack of the executing application. While these solutions apply to Java based solutions, other solutions exist for other technologies, such as Microsoft Windows. For example, Microsoft provides Debugging Tools for Windows. Some embodiments of operation 706 also capture a portion of the executing application. For example, a predetermined number of bytes or number of instructions are captured before and/or after the API call within the executing application.

In operation 708, the information captured or collected in operation 706 is provided to a machine learning model. As discussed above, in some embodiments, the machine learning model is configured to use a reinforcement learning algorithm. The machine learning algorithm is trained, in some embodiments, to maximize a probability that the executing application executes successfully, with successful execution defined by, in some embodiments, one or more of the executing application opening a network connection to a remote device, spawning a new process or thread, or writing data or otherwise creating a file.

In operation 712, a suggested modification is obtained from the machine learning model. The suggested modification is in response to, or otherwise based on, the information provided to the machine learning model in operation 708, such as the provided call stack, and input parameter values of the API call. In some embodiments, the suggested modification is based on an indicated sequence of function calls, previously provided to the machine learning model by operation 708 as discussed above.

As discussed above, several different modifications are suggested by the machine learning model in a variety of circumstances. In some cases, no modification is suggested. In some cases, the machine learning model indicates that a register value or data value of the executing application be modified at a particular execution point of the executing application. In some cases, the modification indicates that a return value or input parameter of an API function be modified. In some embodiments, the suggest modification is to change operation of a conditional statement in the executing application itself, for example, by modifying instructions themselves within the executing application, or by modifying registers and/or data values so as to change the conditional operation of the executing application. For example, a conditional branch is modified, in some embodiments, to take a first path instead of a second path.

In operation 714, the indicated modification is performed. Some embodiments of method 700 are performed iteratively while a single application is being executed. As explained above, the disclosed embodiments provide for increased successful operation of potential malware in a sandbox environment. By enabling the potential malware to execute successfully, additional information regarding the malware is obtained.

This information is used, in some embodiments, to configure run time malware detection software, to identify vulnerabilities in existing software, or to further improve a sandbox testing environment. For example, if, via the disclosed embodiments, a malware application is successfully executed and demonstrates one or more malware type effects (negative effects), a signature of the malware application (e.g. hash or checksum) is added to a security database in some embodiments. The security database is then compared against signatures of executing applications to detect instances of the malware application. In some embodiments, the security database is downloaded to client devices, such as client devices managed by an organization. A virus scanning filter executes on the client devices and detects an executing application. The virus scanning filter then computes a signature of the detected executing application, and compares it to signatures in the security database. The virus scanning filter then detects a match between the dynamically determined signature of the executing application and compares it to one or more signatures included in the security database. If a match is detected, the virus scanning filter causes execution of the application to be halted, aborted, or otherwise mitigated.

Thus, the disclosed embodiments create several technical effects, and represent several technical solutions. A first order technical effect is that a malware application that would otherwise detect a sandbox environment and inhibit performance of one or more of its features as a result, instead does not detect the sandbox environment and performs these one or more features. By performance of the features (such as establishing a network connection, deleting files, spawning additional process, etc), the application's behavior can be more accurately analyzed and profiled. This profile can then be used to identify other instances of the malware application in non-sandbox environments (e.g. operational environments).

An additional technical solution and/or effect provided by the disclosed embodiments is increased accuracy and/or completeness of signature information for known malware applications. By facilitating more complete analysis of malware applications in a sandbox environment, the disclosed embodiments provide enhanced insight into execution of malware applications than would otherwise be possible. This increased analysis ability leads to additional and more accurate signature information being included in security databases, resulting in an overall reduction in the instance of successful malware exploits.

After operation 714, method 700 moves to end operation 718.

Figure 8:
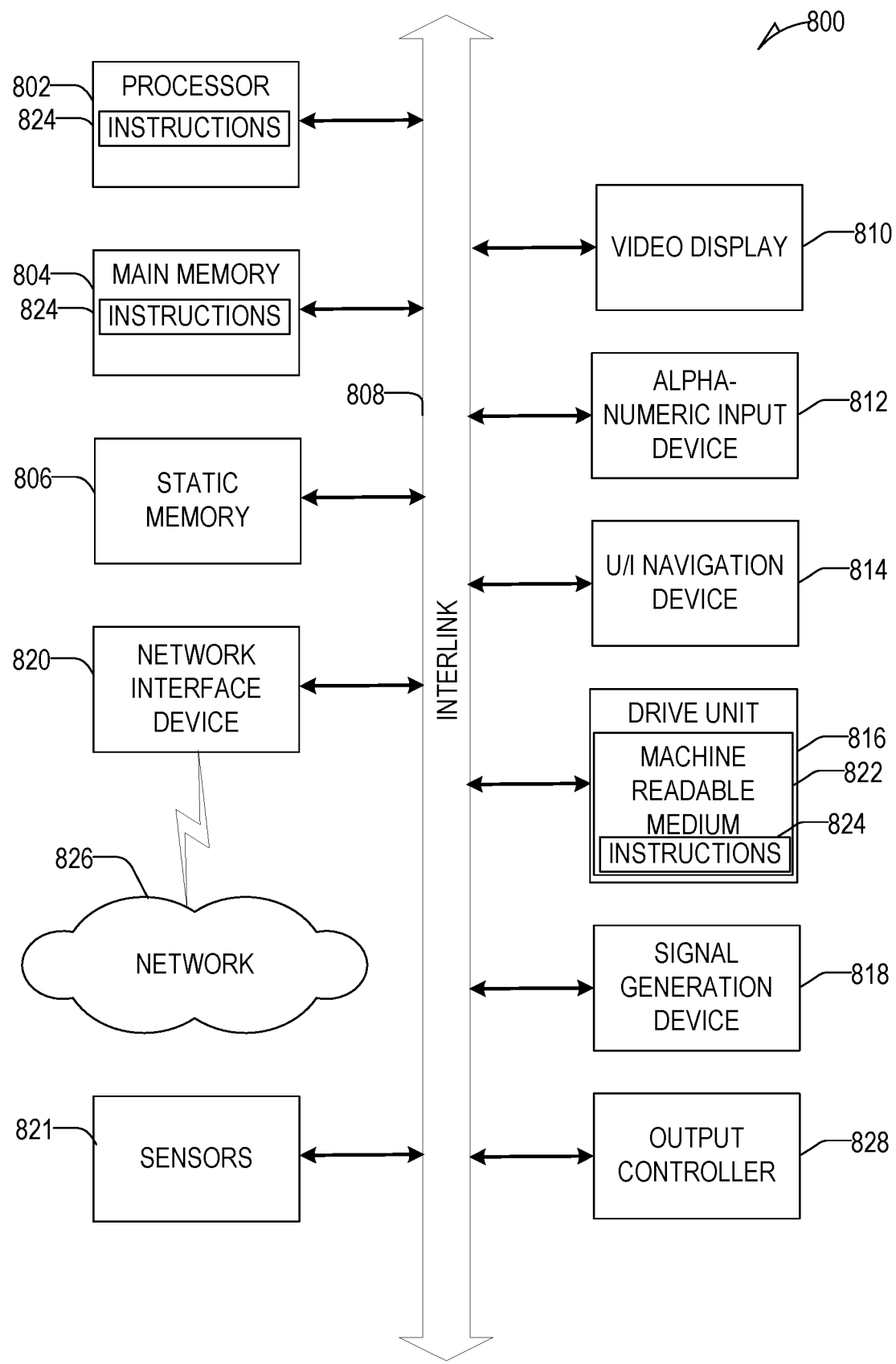
FIG. 8 illustrates a block diagram of an example machine 800 upon which any one or more of the techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or are connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 800 may perform one or more of the processes described above with respect to FIGS. 1-7 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink 808 (e.g., bus). The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 are a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method, comprising: intercepting a sequence of instructions of an executing application; providing the sequence of instructions to a machine learning model; receiving, from the machine learning model based on the provided sequence of instructions, an indication of a modification to the executing application; and performing the indicated modification.

In Example 2, the subject matter of Example 1 optionally includes wherein the sequence of instructions are machine instructions or bytecode instructions.

In Example 3, the subject matter of any one or more of Examples 1-2 optionally include wherein the sequence of instructions include a function call instruction, the method further comprising: determining a call stack of the executing application at the function call instruction; determining parameters of the function call; and providing the call stack and the parameters to the machine learning model, wherein the indication of the modification is further based on the provided call stack and parameters.

In Example 4, the subject matter of Example 3 optionally includes determining second parameters of a second function call, and providing the second parameters of the second function call to the machine learning model, wherein the indication of the modification is further based on the provided second parameters.

In Example 5, the subject matter of any one or more of Examples 3-4 optionally include wherein the modification is a modification of an output of the function call.

In Example 6, the subject matter of Example 5 optionally includes selecting, from a list of return values of the function call, a return value, and setting the output to the selected return value.

In Example 7, the subject matter of any one or more of Examples 3-6 optionally include identifying a control-flow instruction of the executing application, wherein the modification is a modification of the control-flow instruction.

In Example 8, the subject matter of any one or more of Examples 3-7 optionally include capturing a portion of executable code of the executing application within a predefined proximity of the function call, and providing the portion to the machine learning model, wherein the indication of the modification is based on the provided portion.

In Example 9, the subject matter of any one or more of Examples 3-8 optionally include capturing a sequence of function calls by the executing application, and providing data indicating the sequence of function calls to the machine learning model, wherein the indication of the modification is based on the indicated sequence of function calls.

In Example 10, the subject matter of any one or more of Examples 1-9 optionally include wherein the machine learning model is configured to apply a reinforcement learning algorithm, the machine learning model trained to generate a modification that results in successful execution of the executing application.

In Example 11, the subject matter of Example 10 optionally includes wherein successful execution is detected when the executing application creates a new process, creates a new file, creates a new registry entry, establishes a network connection, or the executing application invokes a number of API calls that exceeds a predefined threshold.

In Example 12, the subject matter of any one or more of Examples 1-11 optionally include storing a record in a data store, the record indicating the modification to the executing application.

In Example 13, the subject matter of Example 12 optionally includes identifying based on a plurality of records in the data store, a modification common to the plurality of records; and modifying a sandbox environment configuration, such that the configuration is consistent with the identified modification.

Example 14 is a system, comprising: hardware processing circuitry; one or more hardware memories storing instructions that when executed configure the hardware processing circuitry to perform operations, comprising: intercepting a sequence of instructions of an executing application; providing the sequence of instructions to a machine learning model; receiving, from the machine learning model based on the provided sequence of instructions, an indication of a modification to the executing application; and performing the indicated modification.

In Example 15, the subject matter of Example 14 optionally includes wherein the sequence of instructions are machine instructions or bytecode instructions.

In Example 16, the subject matter of any one or more of Examples 14-15 optionally include wherein the sequence of instructions include a function call instruction, the operations further comprising: determining a call stack of the executing application at the function call instruction; determining parameters of the function call; and providing the call stack and the parameters to the machine learning model, wherein the indication of the modification is further based on the provided call stack and parameters.

In Example 17, the subject matter of Example 16 optionally includes determining second parameters of a second function call, and providing the second parameters of the second function call to the machine learning model, wherein the indication of the modification is further based on the provided second parameters.

In Example 18, the subject matter of any one or more of Examples 16-17 optionally include wherein the modification is a modification of an output of the function call.

In Example 19, the subject matter of Example 18 optionally includes selecting, from a list of return values of the function call, a return value, and setting the output to the selected return value.

In Example 20, the subject matter of any one or more of Examples 16-19 optionally include identifying a control-flow instruction of the executing application, wherein the modification is a modification of the control-flow instruction.

In Example 21, the subject matter of any one or more of Examples 16-20 optionally include capturing a portion of executable code of the executing application within a predefined proximity of the function call, and providing the portion to the machine learning model, wherein the indication of the modification is based on the provided portion.

In Example 22, the subject matter of any one or more of Examples 16-21 optionally include capturing a sequence of function calls by the executing application, and providing data indicating the sequence of function calls to the machine learning model, wherein the indication of the modification is based on the indicated sequence of function calls.

In Example 23, the subject matter of any one or more of Examples 14-22 optionally include wherein the machine learning model is configured to apply a reinforcement learning algorithm, the machine learning model trained to generate a modification that results in successful execution of the executing application.

In Example 24, the subject matter of Example 23 optionally includes wherein successful execution is detected when the executing application creates a new process, creates a new file, creates a new registry entry, establishes a network connection, or the executing application invokes a number of API calls that exceeds a predefined threshold.

In Example 25, the subject matter of any one or more of Examples 14-24 optionally include storing a record in a data store, the record indicating the modification to the executing application.

In Example 26, the subject matter of Example 25 optionally includes identifying based on a plurality of records in the data store, a modification common to the plurality of records; and modifying a sandbox environment configuration, such that the configuration is consistent with the identified modification.

Example 27 is a non-transitory computer readable storage medium comprising instructions that when executed configure hardware processing circuitry to perform operations comprising: intercepting a sequence of instructions of an executing application; providing the sequence of instructions to a machine learning model; receiving, from the machine learning model based on the provided sequence of instructions, an indication of a modification to the executing application; and performing the indicated modification.

In Example 28, the subject matter of Example 27 optionally includes wherein the sequence of instructions are machine instructions or bytecode instructions.

In Example 29, the subject matter of any one or more of Examples 27-28 optionally include wherein the sequence of instructions include a function call instruction, the operations further comprising: determining a call stack of the executing application at the function call instruction; determining parameters of the function call; and providing the call stack and the parameters to the machine learning model, wherein the indication of the modification is further based on the provided call stack and parameters.

In Example 30, the subject matter of Example 29 optionally includes determining second parameters of a second function call, and providing the second parameters of the second function call to the machine learning model, wherein the indication of the modification is further based on the provided second parameters.

In Example 31, the subject matter of any one or more of Examples 29-30 optionally include wherein the modification is a modification of an output of the function call.

In Example 32, the subject matter of Example 31 optionally includes selecting, from a list of return values of the function call, a return value, and setting the output to the selected return value.

In Example 33, the subject matter of any one or more of Examples 31-32 optionally include identifying a control-flow instruction of the executing application, wherein the modification is a modification of the control-flow instruction.

In Example 34, the subject matter of any one or more of Examples 31-33 optionally include capturing a portion of executable code of the executing application within a predefined proximity of the function call, and providing the portion to the machine learning model, wherein the indication of the modification is based on the provided portion.

In Example 35, the subject matter of any one or more of Examples 31-34 optionally include capturing a sequence of function calls by the executing application, and providing data indicating the sequence of function calls to the machine learning model, wherein the indication of the modification is based on the indicated sequence of function calls.

In Example 36, the subject matter of any one or more of Examples 27-35 optionally include wherein the machine learning model is configured to apply a reinforcement learning algorithm, the machine learning model trained to generate a modification that results in successful execution of the executing application.

In Example 37, the subject matter of Example 36 optionally includes wherein successful execution is detected when the executing application creates a new process, creates a new file, creates a new registry entry, establishes a network connection, or the executing application invokes a number of API calls that exceeds a predefined threshold.

In Example 38, the subject matter of any one or more of Examples 27-37 optionally include storing a record in a data store, the record indicating the modification to the executing application.

In Example 39, the subject matter of Example 38 optionally includes identifying based on a plurality of records in the data store, a modification common to the plurality of records; and modifying a sandbox environment configuration, such that the configuration is consistent with the identified modification.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Various embodiments are implemented fully or partially in software and/or firmware. This software and/or firmware may take the form of instructions contained in or on a non-transitory computer-readable storage medium. Those instructions may then be read and executed by one or more processors to enable performance of the operations described herein. The instructions are in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A system, comprising:
   hardware processing circuitry; and
   one or more hardware memories storing instructions that, when executed, configure the hardware processing circuitry to perform operations comprising:
   intercepting a sequence of instructions to be executed by an application executing in a controlled analysis environment;
   providing the sequence of instructions as input to a machine learning (ML) model that is configured to apply a reinforcement learning (RL) algorithm;
   receiving, from the ML model responsive to the input, data indicating a modification to the sequence of instructions, the modification to the sequence of instructions hides that the application is executing in the controlled analysis environment;
   modifying, based on the data, the sequence of instructions resulting in modified instructions; and
   receiving an indication that execution of the modified instructions results in successful execution of the application in the controlled analysis environment.

2. The system of claim 1, wherein the application is a potential malware application, and the controlled analysis environment is a sandbox environment.

3. The system of claim 1, wherein the sequence of instructions include a function call instruction and the operations further comprise:
   identifying a state of a call stack of the application during the function call instruction;
   determining parameters of the function call instruction; and
   providing the state and the parameters as further input to the ML model, wherein the data is further based on the state and the parameters.

4. The system of claim 3, further comprising:
   determining second parameters of a second function call of the sequence of instructions; and
   providing the second parameters of the second function call as further input to the ML model, wherein the data is further based on the second parameters.

5. The system of claim 3, wherein the modification is a modification of an output instruction of a function called by the function call instruction.

6. The system of claim 5, wherein the modification includes selecting, from a list of return values of the function, a return value, and setting the output to the selected return value.

7. The system of claim 3, wherein the modification is a modification of a control-flow instruction of the sequence of instructions.

8. The system of claim 3, further comprising:
   capturing a portion of executable code of the application within a predefined proximity of the function call instruction; and
   providing the portion as further input to the ML model, wherein the modification is based on the portion.

9. The system of claim 3, further comprising capturing a sequence of function calls by the application and providing data indicating the sequence of function calls as further input to the ML model, wherein the indication of the modification is based on the indicated sequence of function calls.

10. The system of claim 1, further comprising storing a record in a data store, the record indicating the data.

11. The system of claim 10, further comprising:
    identifying based on a plurality of records in the data store, a modification common to the plurality of records; and
    modifying a configuration of the controlled analysis environment such that the configuration is consistent with the modification common to the plurality of records.

12. A method of detonating a potential malware application in a controlled analysis environment, comprising:
    intercepting a sequence of instructions to be executed by the potential malware application in the controlled analysis environment;
    providing the sequence of instructions as input to a machine learning (ML) model that is configured to apply a reinforcement learning (RL) algorithm;
    receiving, from the ML model responsive to the input, data indicating a modification to the sequence of instructions, the modification to the sequence of instructions hides that the potential malware application is executing in the controlled analysis environment;

performing the indicated modification to the sequence of instructions resulting in modified instructions; and receiving an indication that execution of the modified instructions results in successful execution of the potential malware application.

13. The method of claim 12, wherein the sequence of instructions include a function call instruction, the method further comprising:

determining a state of a call stack of the potential malware application during the function call instruction;

determining parameters of the function call instruction; and providing the state and the parameters as further input to the ML model, wherein the data is further based on the state and the parameters.

14. The method of claim 13, further comprising:

determining second parameters of a second function call of the sequence of instructions; and providing the second parameters of the second function call to the ML model, wherein the data is further based on the second parameters.

15. The method of claim 13, wherein the modification is a modification of an output instruction of a function called by the function call instruction.

16. The method of claim 13, wherein the modification is a modification of a control-flow instruction of the sequence of instructions.

17. The method of claim 13, further comprising capturing a portion of executable code of the potential malware application within a predefined proximity of the function call instruction, and providing the portion as further input to the ML model, wherein the data is further based on the portion.

18. The method of claim 13, further comprising:

capturing a sequence of function calls by the potential malware application; and providing data indicating the sequence of function calls to the ML model, wherein the data is further based on the indicated sequence of function calls.

19. A non-transitory computer readable storage medium comprising instructions that when executed configure hardware processing circuitry to perform operations comprising:

intercepting a sequence of instructions to be executed by a potential malware application executing in a controlled analysis environment;

providing the sequence of instructions as input to a machine learning (ML) model that is configured to apply a reinforcement learning (RL) algorithm;

receiving, from the ML model responsive to the sequence of instructions, a modification to the sequence of instructions;

performing, while the potential malware application is executing in the controlled analysis environment, the modification to the sequence of instructions resulting in modified instructions; and receiving an indication that execution of the modified instructions results in successful execution of the potential malware application in the controlled analysis environment and hides that the potential malware application is executing in the controlled analysis environment.

* * * * *